United States Patent [19]

Blaser et al.

[11] Patent Number: 5,198,738
[45] Date of Patent: Mar. 30, 1993

[54] METHOD OF DETERMINING THE ROTATIONAL SPEED OF A BRUSHLESS DC-MOTOR

[75] Inventors: Peter T. Blaser, Dielheim; Michael Krüger, Edingen-Neckarhausen; Jürgen Maass, Wiesloch; Helmut Meyer, Weinheim, all of Fed. Rep. of Germany

[73] Assignee: Heidelberger Druckmaschinen AG, Heidelberg, Fed. Rep. of Germany

[21] Appl. No.: 784,758

[22] Filed: Oct. 30, 1991

[30] Foreign Application Priority Data

Nov. 13, 1990 [DE] Fed. Rep. of Germany ....... 4036024

[51] Int. Cl.⁵ .................................................. G01P 3/36
[52] U.S. Cl. .................................. 318/652; 318/254; 324/175; 250/231.180
[58] Field of Search ............... 318/254, 618, 652, 665; 310/68 R; 324/160, 163, 173, 175, 179; 73/488, 518; 250/231.18

[56] References Cited

U.S. PATENT DOCUMENTS

| | | | |
|---|---|---|---|
| 4,228,396 | 10/1980 | Palombo et al. | 324/163 |
| 4,270,074 | 5/1981 | Duckworth et al. | 318/254 |
| 4,490,661 | 12/1984 | Brown et al. | 318/661 |
| 4,565,956 | 1/1986 | Zimmermann et al. | 318/721 |
| 4,701,649 | 10/1987 | Maemine | 310/68 R |
| 4,717,864 | 1/1988 | Fultz | 318/254 |
| 4,782,272 | 11/1988 | Buckley et al. | 318/254 |
| 4,783,705 | 11/1988 | Moon et al. | 360/77 |
| 4,868,443 | 9/1989 | Rossi | 310/268 |
| 4,958,248 | 9/1990 | Trcka | 360/107 |
| 4,983,915 | 1/1991 | Rossi | 324/207.17 |
| 5,021,735 | 6/1991 | Maass et al. | 324/175 |

FOREIGN PATENT DOCUMENTS

| | | |
|---|---|---|
| 3120559 | 12/1982 | Fed. Rep. of Germany . |
| 3742357 | 6/1988 | Fed. Rep. of Germany . |
| 3820903 | 1/1990 | Fed. Rep. of Germany . |
| 3900464 | 7/1990 | Fed. Rep. of Germany . |
| 2221031 | 1/1990 | United Kingdom . |

*Primary Examiner*—Bentsu Ro
*Attorney, Agent, or Firm*—Herbert L. Lerner; Laurence A. Greenberg

[57] ABSTRACT

A method of determining the rotational speed of a three-phase brushless DC-motor, which comprises scanning at least one signal trace disposed on a revolving rotor of a three-phase brushless DC-motor by means of three sensors, each emitting a signal having two possible signal states, the signal trace and the sensors being of such construction and arrangement that eight values are realized by a logical combination of the two possible signal states, respectively, of the three sensors; detecting the rotor position with six of the values; and determining the rotational speed with the other two values.

6 Claims, 3 Drawing Sheets

| Subsection | Trace A Value $2^0$ | Trace B Value $2^1$ | Trace C Value $2^2$ | Total Value |
|---|---|---|---|---|
| I | 1 | 0 | 1 | 5 |
|   | 1 | 1 | 1 | 7 |
|   | 1 | 0 | 1 | 5 |
|   | 1 | 1 | 1 | 7 |
|   | . | . | . | . |
|   | 1 | 1 | 1 | 7 |
| II | 1 | 0 | 0 | 1 |
|   | 0 | 0 | 0 | 0 |
|   | 1 | 0 | 0 | 1 |
|   | . | . | . | . |
|   | 0 | 0 | 0 | 0 |
| III | 1 | 1 | 0 | 3 |
|   | 1 | 1 | 1 | 7 |
|   | . | . | . | . |
|   | 1 | 1 | 1 | 7 |
| IV | 0 | 1 | 0 | 2 |
|   | 0 | 0 | 0 | 0 |
|   | . | . | . | . |
|   | 0 | 0 | 0 | 0 |
| V | 0 | 1 | 1 | 6 |
|   | 1 | 1 | 1 | 7 |
|   | . | . | . | . |
|   | 1 | 1 | 1 | 7 |
| VI | 0 | 0 | 1 | 4 |
|   | 0 | 0 | 0 | 0 |
|   | . | . | . | . |
|   | 0 | 0 | 0 | 0 |

| Subsection | Trace A<br>Value $2^0$ | Trace B<br>Value $2^1$ | Trace C<br>Value $2^2$ | Total Value |
|---|---|---|---|---|
| I | 0<br>1<br>0<br>1 | 0<br>0<br>1<br>1 | 0<br>0<br>0<br>0 | 0<br>1<br>2<br>3 |
| II | 0<br>1<br>0<br>1 | 0<br>0<br>1<br>1 | 1<br>1<br>1<br>1 | 4<br>5<br>6<br>7 |
| III | 1<br>1<br>1<br>1 | 0<br>1<br>0<br>1 | 0<br>0<br>1<br>1 | 1<br>3<br>5<br>7 |
| IV | 0<br>0<br>0<br>0 | 0<br>1<br>0<br>1 | 0<br>0<br>1<br>1 | 0<br>2<br>4<br>6 |
| V | 1<br>0<br>1<br>0 | 0<br>0<br>1<br>1 | 0<br>1<br>1<br>0 | 1<br>4<br>7<br>2 |
| VI | 1<br>0<br>1<br>0 | 0<br>0<br>1<br>1 | 1<br>0<br>0<br>1 | 5<br>0<br>3<br>6 |

METHOD OF DETERMINING THE ROTATIONAL SPEED OF A BRUSHLESS DC-MOTOR

BACKGROUND OF THE INVENTION

1. Field of the Invention

The invention relates to a method of determining the rotational speed of a brushless dc-motor.

dc-motors are increasingly used in drive technology because they distinguish themselves by their high dynamic thrust and good controllability. Brushless DC-motors, i.e., electronically commutated DC-motors, moreover, offer the advantage that they operate almost without maintenance.

With brushless dC-motors, the position of the rotor with respect to the phase windings of the stator is determined by a rotor position generator transmitter. The phase windings of the stator are charged with current via switchable semiconductor valves of an intermediate circuit converter, in accordance with the position signals of the rotor position transmitter. The amount of the respective current which is supplied depends upon the desired torque of the motor. Therefore, the regulation of current generally underlies or forms a foundation for the rotational speed control. For the purpose of determining the rotational speed of the motor, a tachograph is additionally applied to the rotor, which constitutes an additional expenditure, just like the electronics required for transmitting the actual value of the rotational speed.

2. Description of the related Art including information disclosed under 37 CFR 1.97–1.99:

In German Published Non-Prosecuted Application (DE-OS) 38 20 903, a commutator-less DC-motor is described having a rotor bearing on its face an optically detectable signal trace for sersing the angular position of the rotor. In a three-phase motor, the signal trace is divided into three radially arranged individual traces which have three reflecting and three absorbing zones equally distributed over the circumference, the zones in the individual traces being offset 60° electrically from one another. The traces are scanned by three radially arranged sensors, and the respective angular position of the rotor is determined for the purpose of commutation by the output signals of the sensors.

This published German application further proposes using the sensor signals for determining the rotational speed. In this regard, the six pulses generated by the rotor position transmitter per electric cycle, e.g., 18 pulses per armature revolution for a six-phase motor, are additionally used for determining the rotational speed. These 18 pulses per armature revolution, however, are insufficient for an exact control of the motor, especially at lower speed ranges. If a brushless DC-motor is used for the drive of printing machines, an exact determination of the rotational speed over the entire speed range must be assured, in order to attain optimal control performance. As mentioned hereinbefore, the mounting of an additional tachograph on the rotor is no alternative, because, in the manufacture of low-cost drives, every additional expenditure should be avoided.

SUMMARY OF THE INVENTION

It is accordingly an object of the invention to provide a method which provides for additional information concerning the motor to be received from the detection signals of the rotor position transmitter.

With the foregoing and other objects in view, there is provided, in accordance with the invention, a method of determining the rotational speed of a three-phase brushless DC-motor, which comprises scanning at least one signal trace disposed on a revolving rotor of a three-phase brushless DC-motor by means of three sensors, each emitting a signal having two possible signal states, the signal trace and the sensors being of such construction and arrangement that eight values are realized by a logical combination of the two possible signal states, respectively, of the three sensors; detecting the rotor position with six of the values; and determining the rotational speed with the other two values.

In accordance with another mode of the invention, the method includes the other two values appear as a uniform pulse sequence during a revolution of the rotor, and the determining of the rotary speed includes counting the pulse during one revolution of the rotor.

In accordance with an alternative mode of the invention, the other two values appear as a uniform pulse sequence during a revolution of the rotor, and the determining of the rotary speed includes measuring the pulse duration.

This rotational speed information can either be evaluated continuously or only in case of low rotational speeds. If an evaluation in the higher speed range is unnecessary, in accordance with a further mode of the invention, the method includes fading out the other two values in an upper range of the rotary speed. The rotational speed information can thus be caused to fade out by a suitable signal delay and then be changed to normal commutation.

According to the method of the invention, the motor begins to run either in an unequivocal state, or an equivocal state is present which is characterized by the other two values, namely the values 0 or 7, which repeat themselves periodically during one rotor rotation. In order to start the motor while it is in an undefined state, a substitute state is introduced which permits a forward or backward, i.e., clockwise and counterclockwise, turning of the motor. The rotor continues to turn through a subsection, until a defined position o the rotor is reached. The size of this subsection depends upon the number of values 0 and 7 within one section.

In accordance with an additional mode of the invention, the method includes selecting from the three sensor signals two thereof having a like signal state, and detecting the rotor position when the signal state of one of the two selected signals is changed. Thus, for an exact functioning of the method according to the invention, it is sufficient to monitor the signal states of only two sensors.

In accordance with a concomitant mode of the invention, there is provided a method of determining the rotational speed of a three phase brushless DC-motor, which comprises scanning three signal traces disposed on a revolving rotor of a three-phase brushless DC-motor by means of three sensors, each emitting a signal having two possible signal states, the signal traces and the sensors being of such construction and arrangement that eight values are realized by a logical combination of the two possible signal states, respectively, of the three sensors; detecting the rotor position by a combination of pairs of sequential values; and determining the rotational speed by the number of value changes occurring during one revolution of the rotor.

Other features which are considered as characteristic for the invention are set forth in the appended claims.

Although the invention is illustrated and described herein as embodied in a method of determining the rotational speed of a brushless DC-motor, it is nevertheless not intended to be limited to the details shown, since various modifications and structural changes ma be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENTS

Figure 1:
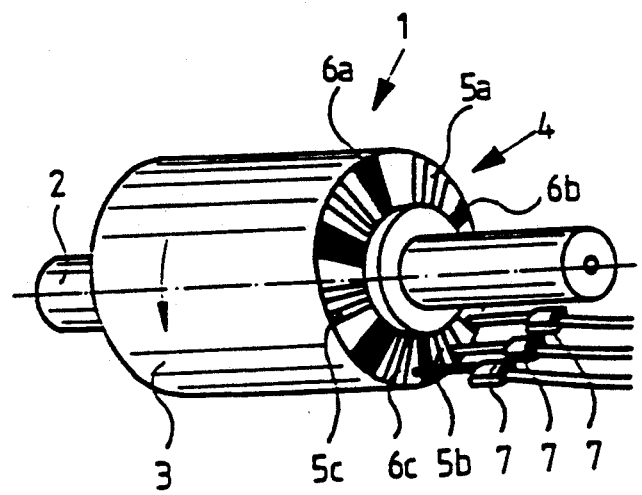
FIG. 1 is a perspective diagrammatic view of a rotor of a dC-motor having a single modified signal trace for performing one mode of the method according to the invention.

Referring now to the drawings and first, particularly to FIG. 1 thereof, there is shown therein a rotor 1 of an otherwise non-illustrated brushless DC-motor. The rotor has a shaft 2 carrying several permanent magnets 3. The permanent magnets 3 are arranged with varying poling and radial magnetizing direction on the shaft 2 so that a rotor with three pole pairs is formed. A signal trace 4 which is divided into reflecting sections 5a, 5b and 5c and absorbing sections 6a, 6b and 6c is disposed on one face of the rotor 1. The signal trace 4 is scanned by three respectively assigned sensor devices 7. According to the method of the invention, the signal trace 4 is modified so that it generates sensor signals A, B and C, according to FIG. 3, when being scanned.

Figure 2:
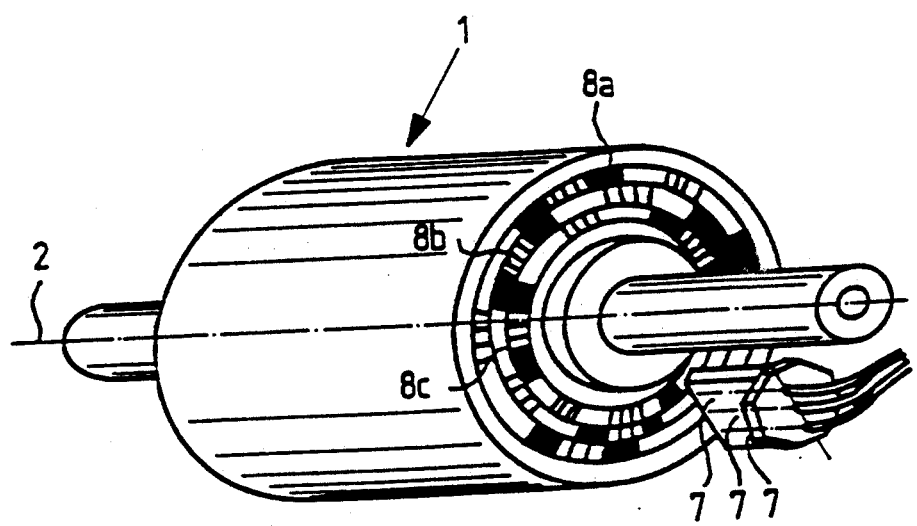
FIG. 2 is a view like that of FIG. 1 of a rotor of a DC-motor having several modified signal traces for performing another mode of the method according to the invention.

FIG. 2 shows a further construction for performing another mode of the method according to the invention. Three signal traces 8a, 8b and 8c are disposed in FIG. 2 on the face of a rotor 1 rotating via a shaft 2. These three signal traces 8a, 8b and 8c are optically scanned by respective radially arranged sensor devices 7. With respective modification of the signal traces 8a, 8b and 8c, the sensor devices 7 generate sensor signals A, B and C, for example, according to FIG. 3 or according to FIG. 5, the signal sequence shown in FIGS. 3 and 5 being usable for determining the rotational speed in both equivalent modes of the method according to the invention.

The performance of the method of the invention in accordance with the two aforedescribed modes thereof is, of course, not limited or restricted to the two constructive arrangements illustrated in FIG. 1 and FIG. 2. The signal traces, for example, can readily be arranged on the outer cylindrical surface of the rotor 1 and be scanned by respectively assigned sensor devices, a suitable combination of the scanning signals, in such a case, too, being applicable for determining the rotational speed. Moreover, the states or conditions of the signals from the sensors required for performing the method according to the invention ca also be realized by different types of signal traces and signal generators or transmitters than those described herein.

Figures 3, 4:
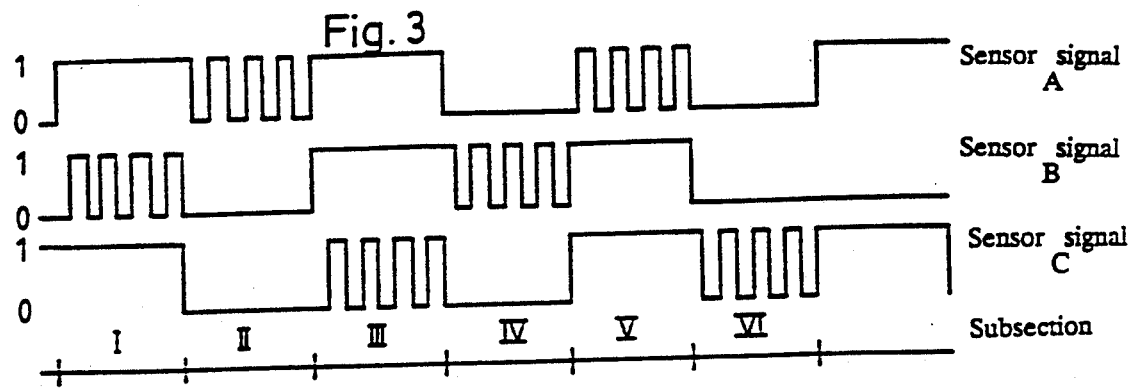
FIG. 3 is a plot diagram of sensor signals A, B and C during a complete cycle of charging the phase windings (360° electric) in accordance with the first-mentioned mode of the method according to the invention.
FIG. 4 is a table of combinations of the sensor signals A, B and C in individual subsections I to VI according to FIG. 3.

FIG. 3 shows the sensor signals A, B and C which are generated by the three sensor devices 7 during an electric cycle corresponding to a mechanical turn of the rotor through an angle of 120°. The unmodified signals are used, in a conventional manner, for determining the rotor position and, thus, for commutation. A conventional non-illustrated control logic assigns the subsection I specifically to the three sensor signals 101, for example, and causes the charging of the respective two phase windings with current as long as this signal sequence occurs. When the commutation signal changes to 100, i.e., when the rotor 1 is disposed in the subsection II, the control logic causes a transfer of the commutation by charging the phase windings assigned thereto with current.

According to the modification of the sensor signals A, B and C shown in FIG. 3, a pulse sequence of 01 and 10 signals, respectively, is generated within one commutating signal. Binary values 111 or 000 thereby periodically appear in the individual subsections I to VI in addition to the commutating signals for determining the rotor position. The number of pulses 111 and 000, respectively, within the signal states of the subsections known for the transfer of the commutation are used for determining the rotational speed. Through an EXNOR combination of the three sensor signals, a uniform pulse sequence of 0 and 1 states is generated. From the number of state changes per unit of time, the rotational speed of the motor can be determined in a simple manner. By means of the number of 01 and 10 pulses, respectively, within one subsection, the number of pulses occurring per revolution can be varied over a broad range, which means that this method permits a determination of rotational speed which has an arbitrarily high resolution.

As is apparent from FIG. 4, the motor starts to run either with a specific or unequivocal state which is characterized by total values 1 to 6, or an equivocal state is present which is identified by total values 0 or 7. If no specific or unequivocal state is present for starting the motor, a substitute state is introduced which permits a forward or backward, i.e., clockwise or counterclockwise, turning of the motor. The rotor 1 continues to turn maximally for one subsection until a defined position is reached, i.e., at the latest, after an undefined turn through a subsection, a specific or unequivocal evaluation of the position of the rotor is possible.

A fading out of the states interfering with the advance of the windings characterized by the sums or total values 0 and 7, respectively can be cut off by the following method:

Because two of three sensor signals are sufficient for an accurately functioning evaluation of the position of the rotor, the non-illustrated conventional control logic selects two sensor signals of equivalent value. If the sensor signal A as well as the sensor signal B exhibit the value 1, the subsection I is specifically or unequivocally characterized thereby. Likewise, the subsection II is specifically or unequivocally characterized by the value 0 of the sensor signals B and C. For rotor position detection, the control logic also checks whether two identical states exist on the three traces which are present, and it ignores the third trace until the two traces accept unequal levels. If this should occur, it means unequivocally that the next section has been reached, and the position evaluation can take place anew.

The additional rotary speed information which is gained from the uniform sequence of pulses generated by the revolution of the rotor can either be evaluated continuously or only at low rotary speeds. If an evaluation is unnecessary at higher speeds, this rotary speed information can be faded out by means of a signal delay, and then be converted to a normal motor commutation.

Figures 5, 6:
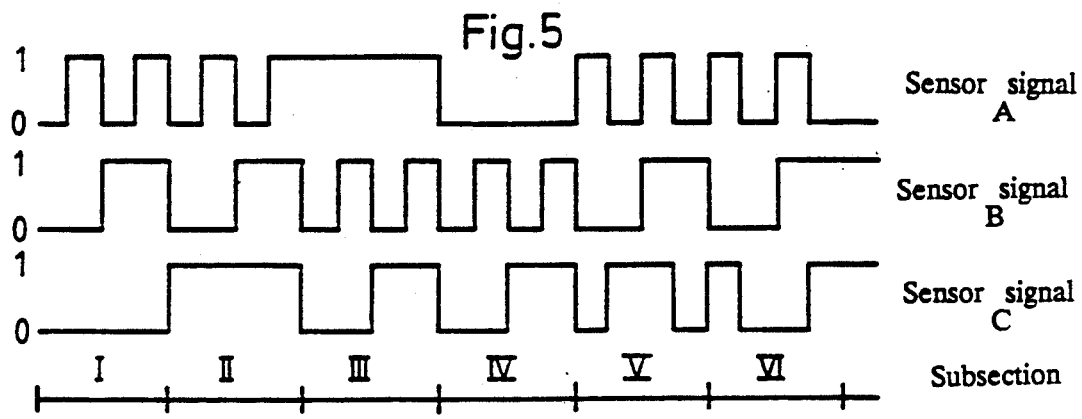
FIG. 5 is a plot diagram of sensor signals A, B and C of the three sensors over a complete cycle of charging the phase windings (360° electric) in accordance with the other mode of the method according to the invention.
FIG. 6 is a table of combinations of the sensor signals A, B and C in the individual subsections I to VI according to FIG. 5.

FIG. 5 illustrates a further mode of the inventive method wherein the sensor signals A, B and C vary between the two states 1 and 0 in the subsection I to VI which constitute one electric revolution of the rotor. The summing or totalizing of these sensor signals produces values which, in a combination of two successive values, permit a specific or unequivocal indication as to the particular subsection in which the rotor 1 is located. Thus, for example, a sequence of the values 0 and 1 appears only in the section I. By also using the total values 0 and 7, which usually are unnecessary for the commutation, 3×8 or 24 rotary speed information can be received with a six-pole motor per electric revolution of the rotor. Additionally, this method produces information about the direction of revolution. While the combination of two successive total values or sums of the sensor signals A, B and C permits a definite commutation evaluation, the number of changes of the sums or total values is used for determining the rotary speed, i.e., every change of the sum or total value is recorded or registered by a control logic and added to the 72 change signals per mechanical revolution of the rotor.

As with the first mode of the method according to the invention described herein, an unequivocal or specific evaluation of the position of the rotor at the start of the motor is also not possible with the second mode of the method. The existing value of the rotor position transmitter is equivocal in three different ways. Therefore, as is the case with the first mode of the control method, a state is activated which permits a forward and backward, i.e., clockwise and counterclockwise, turning of the rotor. After a partial turn of ¼ of the subsection, however, another sum or total value has already appeared, i.e., after a partial turn of ¼ of the subsection, together with the previous state, the actual position of the rotor can be determined unequivocally.

The foregoing modes of the method according to the invention can be applied also to motors having other numbers of poles.

The foregoing is a description corresponding in substance to German Application p 40 36 024.5, dated Nov. 13, 1990, the International priority of which is being claimed for the instant application, and which is hereby made part of this application. Any material discrepancies between the foregoing specification and the aforementioned corresponding German application are to be resolved in favor of the latter.

We claim:

1. Method of determining the rotational speed of a three-phase brushless DC-motor, which comprises the steps of scanning at least one signal trace disposed on a revolving rotor of a three-phase brushless DC-motor by means of three sensors, each sensor emitting a signal having two possible signal states, the signal trace and the sensors being of such construction and arrangement that eight values are generated by a logical combination of two possible signal states, respectively, of the three sensors; detecting the rotor position with six of the values; and determining the rotor rotational speed with the other two values.

2. Method according to claim 1, wherein the other two values appear as a uniform pulse sequence during a revolution of the rotor, and the steps of determining of the rotor speed includes counting the pulse during one revolution of the rotor.

3. Method according to claim 1, wherein the other two values appear as a uniform pulse sequence during a revolution of the rotor, and the step of determining of the rotor speed includes measuring the pulse duration.

4. Method according to claim 1, which includes the step of fading out the other two values in an upper range of the rotor speed.

5. Method according to claim 1, which further comprises the steps of selecting from the three sensor signals two thereof having a like signal state, and detecting the rotor position when the signal state of one of the two selected sensor signals is changed.

6. Method of determining the rotational speed of a three phase brushless DC-motor, which comprises the steps of scanning three signal traces disposed on a revolving rotor of a three-phase brushless DC-motor by means of three sensors, each emitting a signal having two possible signal states, the signal traces and the sensors being of such construction and arrangement that eight values are generated by a logical combination of the two possible signal states, respectively, of the three sensors; detecting the rotor position by a combination of pairs of sequential values; and determining the rotor rotational speed by the number of value changes occurring during one revolution of the rotor.

* * * * *